(12) United States Patent
Leisner

(10) Patent No.: US 9,475,529 B2
(45) Date of Patent: Oct. 25, 2016

(54) MULTI-PURPOSE ATV TRAILER

(76) Inventor: Jeffery Leland Leisner, Bruce, WI (US)

( * ) Notice: Subject to any disclaimer, the term of this patent is extended or adjusted under 35 U.S.C. 154(b) by 498 days.

(21) Appl. No.: 13/526,081

(22) Filed: Jun. 18, 2012

(65) Prior Publication Data
US 2016/0152289 A1    Jun. 2, 2016

(51) Int. Cl.
*B62D 63/00* (2006.01)
*B62D 63/06* (2006.01)
*B60P 1/43* (2006.01)
*B60P 3/06* (2006.01)

(52) U.S. Cl.
CPC .............. *B62D 63/064* (2013.01); *B60P 1/435* (2013.01); *B60P 3/06* (2013.01)

(58) Field of Classification Search
CPC ......... B62D 63/064; B60P 1/435; B60P 3/06
See application file for complete search history.

(56) References Cited

U.S. PATENT DOCUMENTS

| | | | | |
|---|---|---|---|---|
| 4,854,631 A | * | 8/1989 | Laursen | B60P 3/32 14/71.1 |
| 6,050,737 A | * | 4/2000 | Russell | B60P 3/079 403/43 |
| 2002/0157899 A1 | * | 10/2002 | Smith | A01M 31/02 182/63.1 |
| 2003/0222431 A1 | * | 12/2003 | Crosby | B62D 63/061 280/656 |
| 2011/0217137 A1 | * | 9/2011 | Benesch | B62D 63/06 410/4 |

\* cited by examiner

*Primary Examiner* — Joseph D Pape
(74) *Attorney, Agent, or Firm* — Dale J. Ream

(57) ABSTRACT

A trailer that can transport an ATV being towed behind an automobile, and then be pulled behind an ATV, and provides a means to transport tools or gear protecting them from the elements. The trailer having rounded corners for brush deflection, also having a gap bed that accommodates a weather proof storage box that extends from below the deck level to above the deck level, wherein the wheels of an ATV straddle this gap utilizing the ground clearance of the vehicle. The decks may be hinged for access to additional storage area below them.

4 Claims, 6 Drawing Sheets

MULTI-PURPOSE ATV TRAILER

BACKGROUND OF INVENTION

1. The Field of Invention

The present invention relates to a multi-purpose ATV trailer. Both for transporting ATV's on public roads and highways and the same trailer may be pulled by ATV's on trails, having storage compartments for gear or equipment.

2. Description of Related Art

Many times it is needful to transport an ATV on the public roads to a desired location, most often by means of a utility trailer or flat bed or pick-up truck, once to this location it is offloaded from the trailer or truck, and if tools/gear or equipment are needed, it is then loaded or packed on the back of the ATV or into a trailer made for trail use for ATV's, this ATV trailer must also be transported along with the ATV in the utility trailer.

ATV trailers along with utility trailers are well known in art. However, the trailers and storage units in prior art do not provide a versatile trailer that eliminates the need for two trailers and incorporates storage, making it adaptable to many types of activities one might engage in.

The Huff U.S. Pat. No. 3,731,831 discloses a trailer capable of loading or unloading from either end having a pivoting draw bar, also having storage area over the wheels that extends both above and below the deck height, however this trailer is not meant for trail use and structure has little in common with this present invention.

The Richard U.S. Pat. No. 7,188,857 discloses a transformable trailer having capability short box trailer into a flat bed trailer, has little or no structure found in this present invention.

The Niehoff U.S. Pat. No. 6,378,904 discloses an ATV trailer having a steel tubing frame and heavy duty axle, triangular wings for tree deflector, and has a single center cargo area, however it's structure is otherwise different from this present invention.

The Greer U.S. Pat. No. Des. 601,059 has an ATV trailer with an enclosed cargo bed, but has little structure in common with the present invention.

The Cheney U.S. Pat. No. 5,299,722 shows a double lid truck storage box mounted in the back of a pick-up box, this storage being similar only in that it protects against the elements, and designed for fitting the back of a pick-up box, it's application differs from this current invention.

The Mishoe U.S. Pat. No. Des. 376,564 discloses an ATV trailer having a tip-up ramp with an open frame design, rather than a versatile trailer with storage found in this present invention.

The Neage, Meidanis & Koehler U.S. Pat. No. 6,129,401 disclose a vehicle storage bin that lies below the normal bed of the truck and conforms to the cosmetics of the exterior but has no structure in common with current invention.

Whatever the features, advantages or merits of the above cited references may be, none of them achieves the purposes of the trailer of this present invention.

SUMMARY OF INVENTION

The present invention is a multi-purpose ATV trailer that can both haul an ATV loaded on it and be pulled by an automobile or pick-up truck on public roadways, or be pulled by an ATV on trails or off road, this trailer having a preferred steel tube structure utilizing the axle tube and tong as supporting members for a gap bed and opposing wishbone frame, that can carry a storage box that protects gear or cargo against the elements, this box is nested in the gap bed, and it extends from below the deck level to above the deck level were the wheels of the ATV when loaded straddle the storage box (that extends above the deck level) taking advantage of the ground clearance that's built into the design of modern ATV's, also having a separate storage area that extends to the front or rear of the main storage box, this smaller (in volume, not height or width) storage area is covered yet is vented so a person can carry a gas or fuel cans without any build up of fumes or contaminating cargo in the large storage box, this trailer may also incorporate hinged decking to access storage areas directly bellow the decking, the center of gravity of this new trailer design makes it road and trail worthy, and allows a person to load their equipment one time, and eliminates the need for two trailers.

An object of the invention is to provide a dual purpose ATV trailer having the capability to transport an ATV on public roads and also be used off road towed by an ATV.

Another object of this invention is to provide an ATV trailer with a gap frame design to accommodate a storage box that extends from bellow the deck to above the deck, for transporting gear/equipment protecting them from the elements.

Still another object is maximizing space both above and below the deck or bed area by taking advantage of the ground clearance of an ATV, and space below the deck level, yet retaining reasonable ground clearance.

And yet another object of this invention is to provide a trailer capable carrying a heavy payload in excess of the weight of an ATV.

Additional objects, advantages or span of this invention will become apparent from the following description and accompanying drawings.

DETAILED DESCRIPTION OF THE INVENTION

Figure 2:
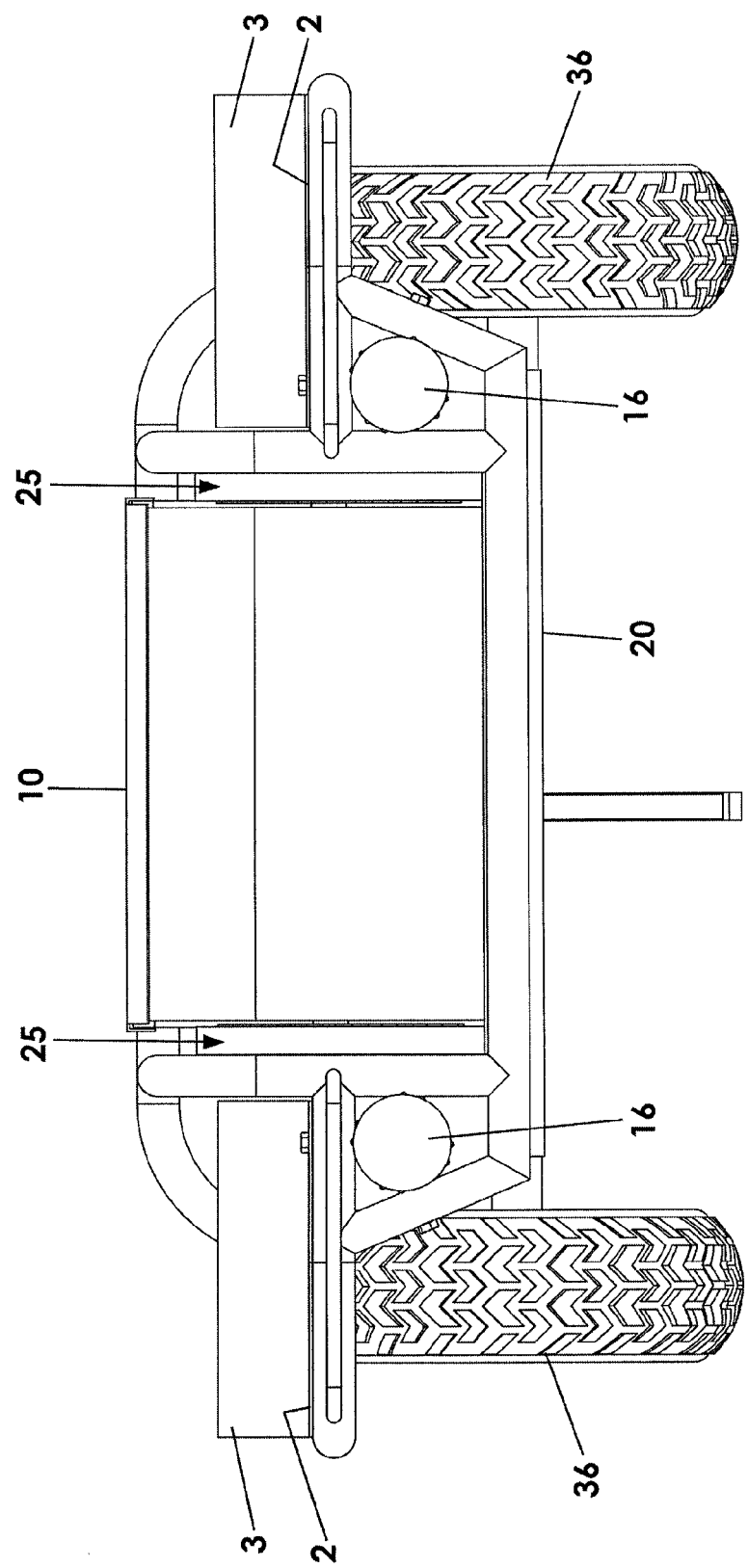
FIG. 2 is a rear view of the ATV trailer as in FIG. 1.
Figure 3:
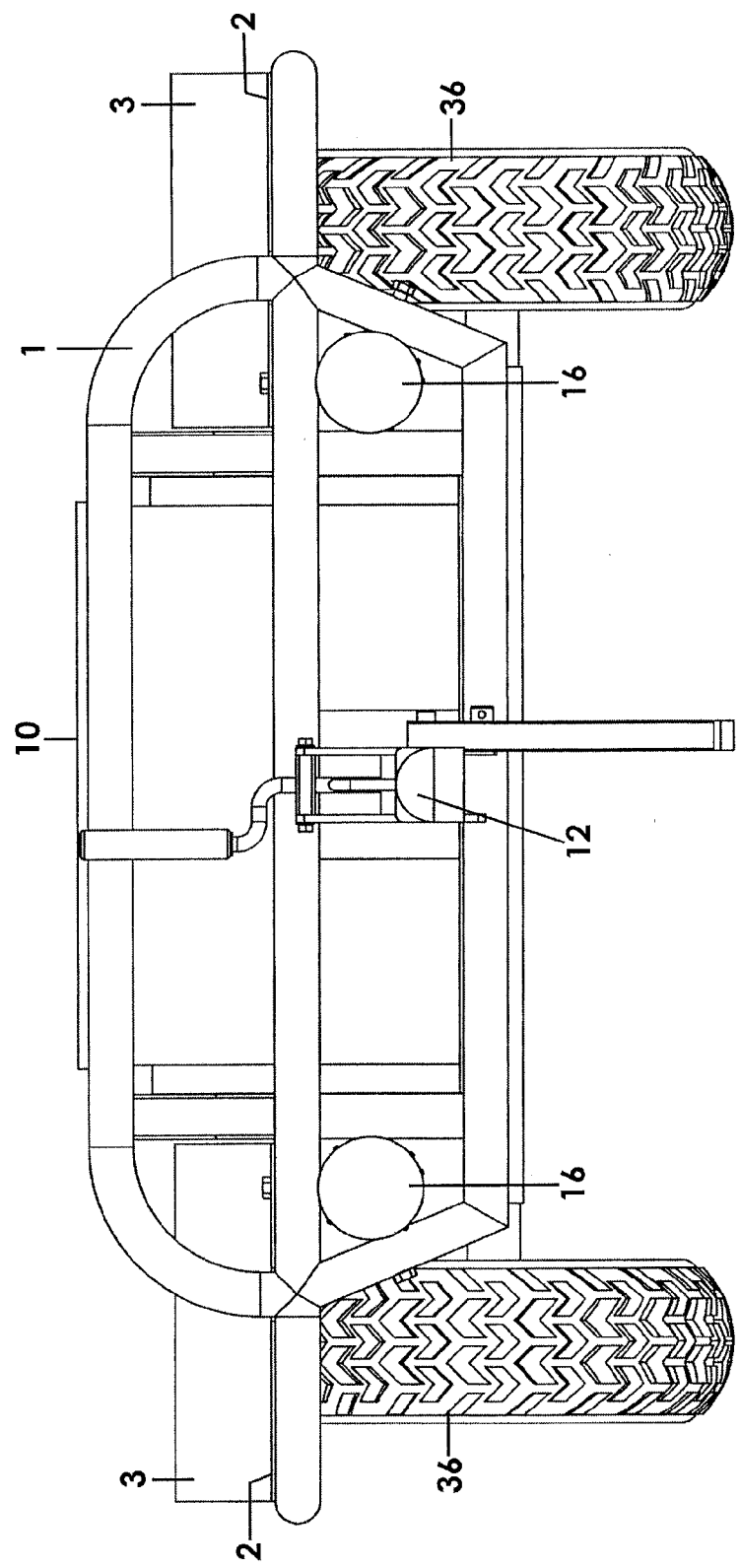
FIG. 3 is a front view of the ATV trailer as in FIG. 1.

Refer now to FIG. 2 which is an overall drawing of a preferred embodiment of the invention. The multipurpose ATV trailers size is just slightly wider than an ATV being a few inches on each side, and length about the same as an ATV that its designed for, there being many different sizes of ATV's, trailers would be designed with axle tube 20 or torsion suspension matched to accommodate the weight of the vehicle it's designed to carry and an additional payload, wherein the frame members are tubing made of steel or alloy, frame members are welded to each other, and axle tube 20 is bolted in position, gussets 39 may be added for ease of welding or for strengthening where needed to construct the frame, frame mount plates 22, these mount plates are bolted or welded to the axle tube mounts 41, axle tube 20 has mounting flanges 41 located that the bridge frame seen in FIG. C will attach to 22 frame mounting plates, preferably 20 consists of a torsion tube suspension, the overall length of 20 is equal to the width of the trailer including the wheels 36, tongue channel 19 is also bolted or welded to the axle tube tongue mount 42, bolting the axle tube in place could allow for better axle service and manufacturing purposes, tongue channel 19 is a welded into the construction of the frame, transferring the load from hitch to axle tube, by doing so it removes stress off the smaller frame members, 19 at the front of trailer adjoins 21 that consists of a steel piece that is welded to several frame members for strength, tongue channel 19 has member 11 front tongue being just slightly smaller in size to allow the two pieces 19 and 11 to slide one inside the other to give the driver more options on the overall tongue length, for trail riding, one may want a short tongue for better trailing abilities, and for hi-way a person may want a longer tongue length, implementing a typical ball hitch 12 attached to the end of member 11 for towing trailer behind an auto, pick-up truck or ATV.

Figure 1:
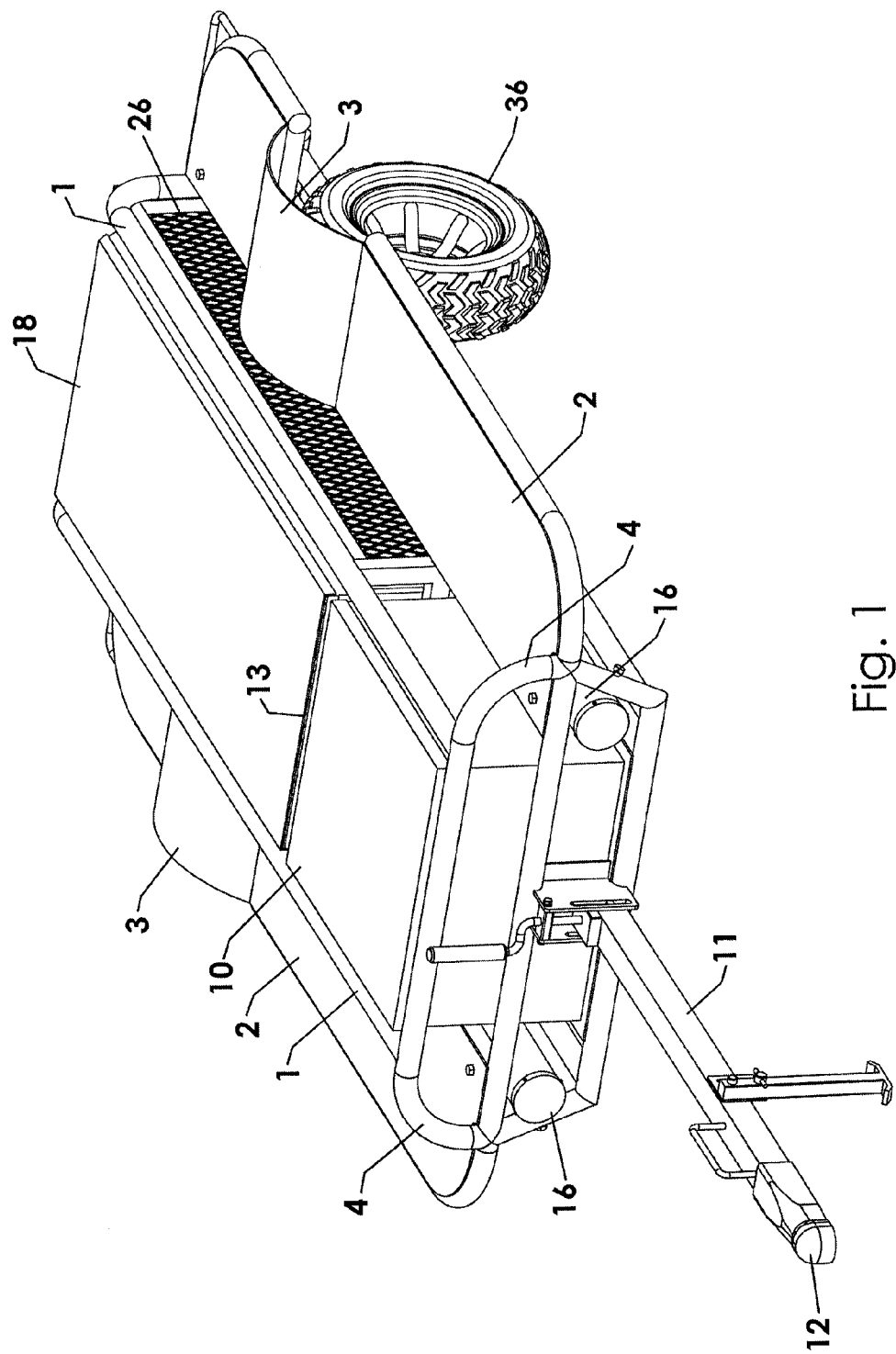
FIG. 1 is a perspective view of a multi-purpose ATV trailer according to a preferred embodiment of the present invention.

The gap bed frame shown in FIG. A is given strength by the lateral bridge type assembly containing member 31 shown in FIG. C in conjunction with lateral members 29, angular braces 33, vertical members 34, along with member 22 the axle mounting plate that is on the bottom of the assembly, this assembly stands vertical, and parallel to the tongue of the trailer, two of these bridge assemblies create the gap in the trailer by being connected on the bottom by member 35 as seen in FIG. A, bridge assemblies are the width gap bed positioning them directly bellow the deck on the inside edge, and travel the entire length of the trailer, from these lateral bridge assemblies are connected the wishbone deck support braces, member 28 and 32 as seen in FIG. A with member 35 located at every section that has a wishbone support, these supports adjoins member 37, member 37 is the outward most member to which the deck 2 rests upon, following the deck, starting from the fenders 3 horizontal along the outside edge, around the corners 6 making the 90 degree corner continuing to member 29 where both member's top surfaces adjoins flush, a dashed line in FIG. A shows member 38 seen in FIG. 1, this member ties the two wishbone weldment together in multiple locations in a plane that is the same level as the upper wishbone members 32 and upper member 29 of the lateral bridge section, by this strength is added to the structure. The fenders 3 are only tall enough to allow for wheel clearance, these fenders 3 along with the deck material are a non slip surface such as diamond or tread plate of proper strength to support the intended load, ATV's and the like are able to drive over these fenders 3 when loading and unloading.

Figure 4:
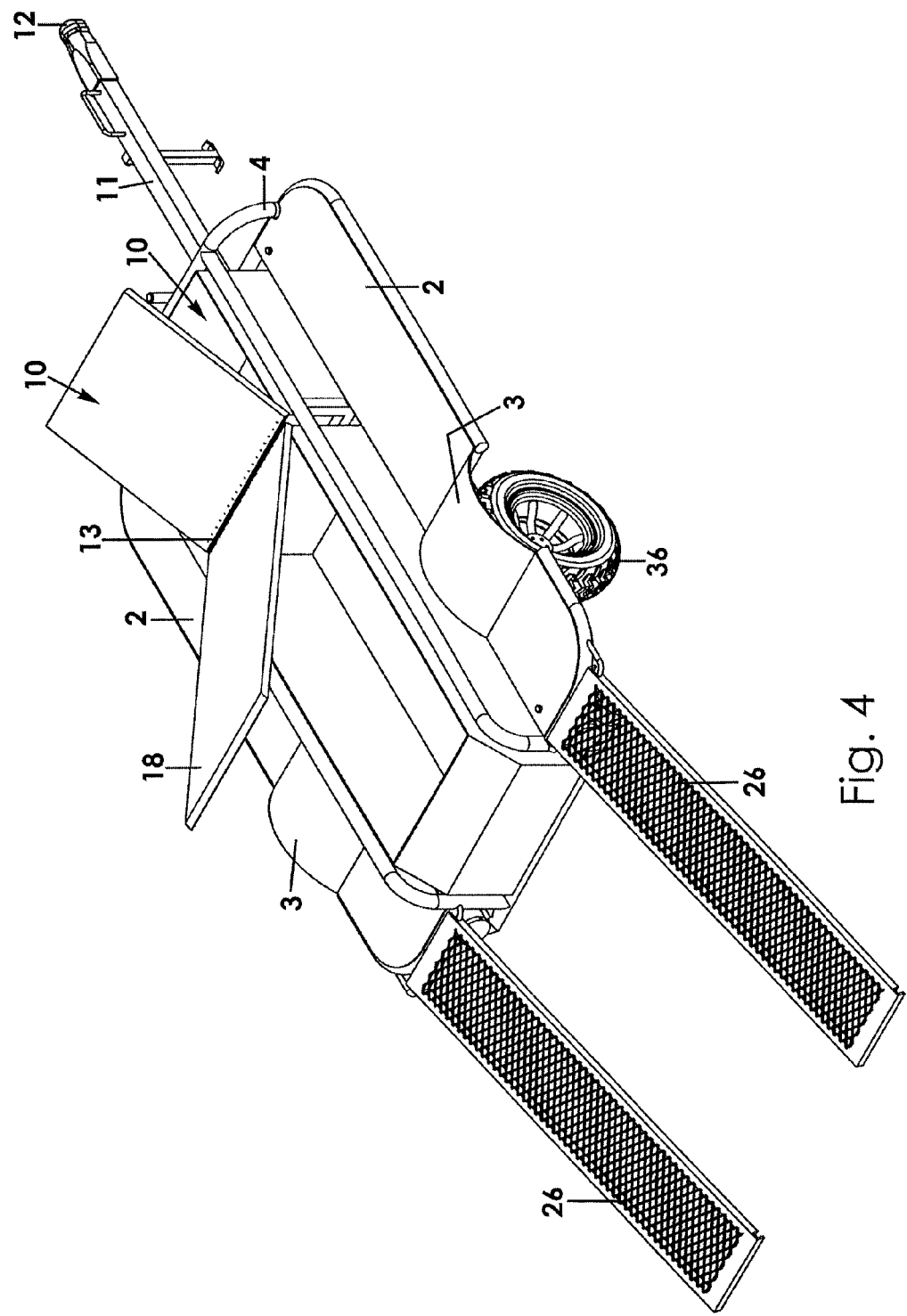
FIG. 4 is a perspective view of the ATV trailer as in FIG. 1, illustrated in a deployed configuration.

Fenders 3 may be flanged on the edges that run parallel to the bridge frame, both the inside and outside edge to increase strength, fenders 3 are crowned to accommodate the wheel clearance and may have be bent slightly on there ends to attach to member 32, the upper wishbone frame, there is a frame member 32 both in front and behind the wheels 36 as seen in FIG. 4 represented by a dashed line, the deck 2 is hinged 14 and lays flat on the deck frame seen in FIG. 1, these decking plates 3 located both behind and in front of the wheel fenders 3. FIG. 1 shows that the corners of the trailer and decking are rounded, this giving a better way to deflect brush or trees when traveling off road, and better aerodynamics on the road.

In FIG. 2 you see member 4, this acts as a wheel stop or safety stop, member 4 is attached to the front wishbone frame on one side extending vertical to above the deck bent 90 degree's and travels horizontally to the opposite side and then 90 degrees down to the wishbone frame members 32 of opposing side, the level it travels horizontally is the same height as member 1 and is attached, this being a wheel guide bar 1, this guard bar 1 is used to guide the inside of the wheels of an ATV or like from damaging the storage box 10 that extends above the deck surface, buy guiding the inside of the wheels when loading and unloading, 10 will typically be 6-7" above deck 3 level depending of the vehicle it's designed to transport.

Figure 5:
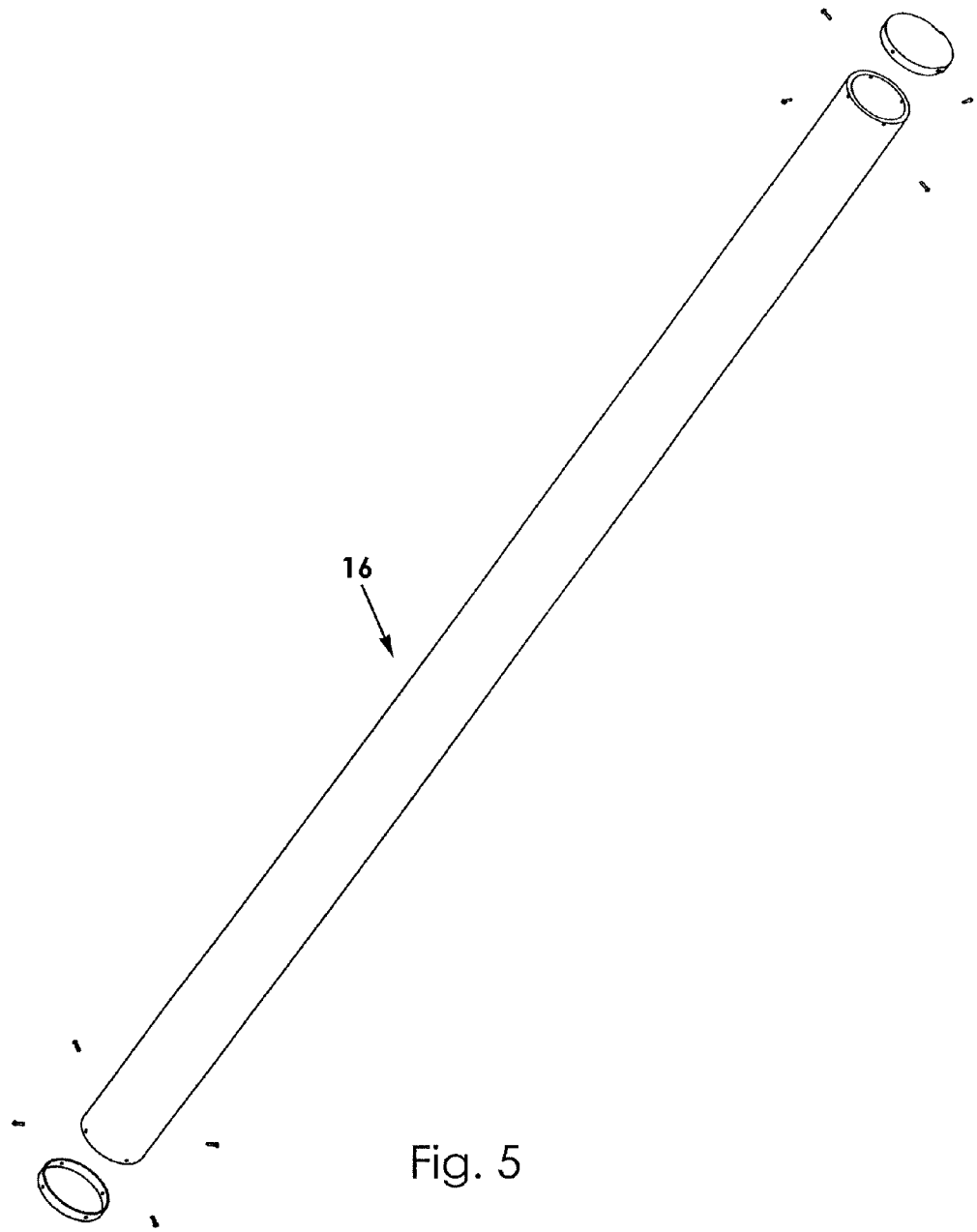
FIG. 5 is an isolated enlarged view of a fender deck enclosure removed from the main trailer body.
Figure 6:
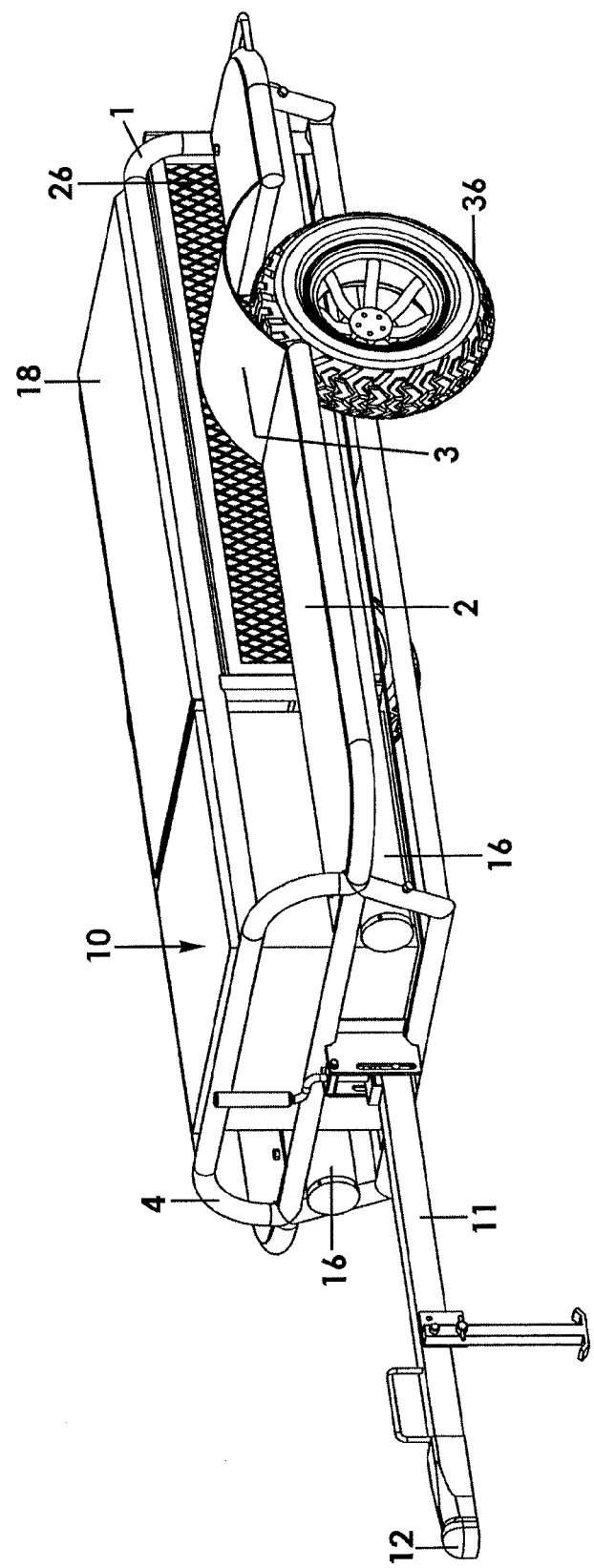
FIG. 6 is another perspective view of the ATV trailer as in FIG. 1.

In FIG. 5 member 40 is shown as a vertical support, for guard bar 1 at the rear of the trailer, in FIG. 5 you also see the storage box 10 and members 26, item 26 shown on each side of the storage box are loading ramps 26, also notice the box is narrower than the gap in the trailer, this area on each side of the box allows the space for stowing these ramps 26, the ramps 26 are laid on there side, in a vertical position, and slid in the back of the trailer in ramp channels 25 shown in blow-up picture on FIG. 5, these ramp channels 25 are formed sheet metal the length of the rams 26 also being and are welded or attached to the trailer frame. This unique ramps storage allows you to access the ramps when the trailer is loaded.

Below deck storage enclosures 16 are found below all four deck 2 sections, these are in front and behind the fenders 3 on both sides of the trailer, these enclosures 16 are made of vacuum formed plastic or fibber glass. In FIG. 2 these enclosures 16 conform to the outside shape of the trailer and are attached to frame member 37 at deck 3 level and go down from there wrapping around to the bottom side to the upper bridge frame member 29, enclosures 16 on fender 3 side edge, extend up and attach to wishbone frame member 32, attaching is by means of rivets or screws, these storage 16 enclosures are shaped or formed to cover four sides and the bottom, having rounded corners, the rear below deck enclosures 16 are recessed to accommodate the tail light/turn signals 17, tail lights are recessed within the frame profile as to not be vulnerable to breakage.

FIG. 2 and FIG. 4 show a ramp retainer 9, this ramp retainer 9 is made of a formed steel rod, and welded to lower section of member 37, allows a place to attach the ramps 26 while loading or unloading, the ramps 26 will have a cleat on the end, and parallel to the end facing down, that will engage in the slot formed by ramp retainer 9.

Member 10 is a storage box that can be removed, having a hinged lid 13, this box has a width that fills the gap bed leaving just enough room on each side to accommodate the ramp channels 25 and ramps, length of ramps 26 & ramp channels 25 being the same length.

FIG. 2 shows a hinged 15 cover 18 directly in front of the box 10, this cover 10 is mounted on the guard bar 1, being hinged 15 on one side, and held closed on the opposite side by means of a typical latch, this cover 18 has two edges that are flanged down, perpendicular to the hinged side for added strength, this covers the remainder of the gap bed forward of the box. Sheet metal box is used to enclose the remainder of this storage area bellow the cover 18, having 4 sides and a bottom with the sides having at least some vents.

The gap bed trailer takes advantage of ground clearance (ground to frame/drive train, without interference) of an ATV, this embodiment of a raised center, could be achieved also by a unibody design, by making the box a heavier or stronger design mounted directly to the axle and tongue, and use this as the frame of the trailer, adding wishbone frame work to the side of the box, rather than a tubing frame structure, maintaining storage space both above and bellow the trailer deck, this deck could also be made solely out of hinged storage boxes, and these are attached to the side of the main center box, resulting in another version consistent with the objects of this invention. With ATV's being made in various sizes and shapes, wheel sizes could also be changed to the point that a flat top deck could be used without the need for fenders, along with side bellow-deck storage could also be eliminated for a more cost effective version.

The foregoing description of the preferred embodiment of the invention has been presented for the purpose of illustration and description. Not being the exhaustive or limit of the invention to the precise form described. Many modifications and variations are possible in light of the above teaching. It is intended that the scope of the invention be limited not by detailed description alone, but rather in conjunction with the claims appended hereto.

What is claimed:

1. An ATV trailer having a multi-purpose that is able to both transport an ATV on public roads and yet be suitable for use off road being pulled by the ATV, comprising:
   a trailer having a tongue member configured for towing by the ATV and having a pair of wheels operatively connected by an axle;
   wherein said trailer includes a deck having a generally planar configuration and defining a pair of fenders extending upwardly over said wheels, respectively;
      said deck configured to support wheels of the ATV thereon;
   wherein said deck defines a storage area centrally positioned atop said deck and extending from a back of the deck to a front of the deck, said storage area having a width of less than a distance between the tires of the ATV when the ATV is supported atop said deck;
   a storage box nested in said deck in said storage area and displaced inwardly from lateral edges thereof so as to be situated between respective tires of the ATV when the ATV is supported atop said deck;
   wherein said storage box includes at least one upper panel that is pivotally mounted and movable between an open configuration allowing access inside said storage box and a closed configuration preventing access inside said storage box;
   a pair of ramps selectively positioned in said storage area adjacent said storage box.

2. The ATV trailer as in claim 1 wherein said tongue is length adjustable.

3. The ATV trailer as in claim 1 wherein said storage box is removable from said deck.

4. The ATV trailer as in claim 1 having rounded corners for better brush or tree deflection.

* * * * *